(12) United States Patent
Manring et al.

(10) Patent No.: US 11,722,041 B2
(45) Date of Patent: Aug. 8, 2023

(54) SLOTTED STATOR CORE AND ADDITIVE MANUFACTURING METHOD FOR PRODUCTION

(71) Applicant: Cummins Inc., Columbus, IN (US)

(72) Inventors: Edward B. Manring, Columbus, IN (US); Ross A. Phillips, Columbus, IN (US); Steven E. Ferdon, Columbus, IN (US)

(73) Assignee: Cummins Inc., Columbus, IN (US)

( * ) Notice: Subject to any disclaimer, the term of this patent is extended or adjusted under 35 U.S.C. 154(b) by 337 days.

(21) Appl. No.: 16/936,913

(22) Filed: Jul. 23, 2020

(65) Prior Publication Data

US 2021/0044185 A1 Feb. 11, 2021

Related U.S. Application Data

(60) Provisional application No. 62/882,635, filed on Aug. 5, 2019.

(51) Int. Cl.
*H02K 15/085* (2006.01)
*H02K 1/16* (2006.01)
*B33Y 80/00* (2015.01)

(52) U.S. Cl.
CPC ............ *H02K 15/085* (2013.01); *H02K 1/16* (2013.01); *B33Y 80/00* (2014.12)

(58) Field of Classification Search
CPC ......... H02K 15/085; H02K 1/16; B33Y 80/00
See application file for complete search history.

(56) References Cited

U.S. PATENT DOCUMENTS 5,515,818 A * 5/1996 Born ................. H02K 41/0356
123/90.11
5,782,411 A * 7/1998 Potter ................. F02M 59/466
239/585.1

(Continued)

FOREIGN PATENT DOCUMENTS

CN 108336872 A * 7/2018 ............ B22F 3/1055
CN 109643939 A * 4/2019 ............. B22F 3/008

(Continued)

OTHER PUBLICATIONS

Additive manufacturing of an electric drive, a feasibility study, 2018 International Symposium on Power Electronics, Electrical Drives, Automation and Motion, pp. 1327-1331 (Year: 2018).*

(Continued)

*Primary Examiner* — Peter Dungba Vo
*Assistant Examiner* — Jose K Abraham
(74) *Attorney, Agent, or Firm* — Taft, Stettinius & Hollister LLP (57) ABSTRACT

A one-piece solenoid stator core is provided, comprising: a plurality of outer wall segments; a plurality of inner wall segments; and a lower wall extending between the plurality of outer wall segments and the plurality of inner wall segments; wherein a plurality of outer slots is defined between the plurality of outer wall segments and a plurality of inner slots is defined between the plurality of inner wall segments, each of the outer slots being radially aligned with an inner slot relative to a central axis of the stator core.

20 Claims, 5 Drawing Sheets

(56) References Cited

U.S. PATENT DOCUMENTS

| | | | | |
|---|---|---|---|---|
| 6,322,048 | B1* | 11/2001 | Gramann | H01F 7/127 251/129.1 |
| 6,892,970 | B2* | 5/2005 | Nussio | F02M 57/023 239/585.4 |
| 10,254,499 | B1* | 4/2019 | Cohen | B23K 1/20 |
| 10,562,226 | B1* | 2/2020 | Cohen | B29C 48/05 |
| 10,571,642 | B1* | 2/2020 | Cohen | G02B 6/25 |
| 2004/0118952 | A1* | 6/2004 | Nussio | H01F 7/1638 239/585.1 |
| 2010/0253160 | A1* | 10/2010 | Jones | H02K 11/33 310/43 |
| 2014/0035423 | A1* | 2/2014 | Veronesi | B33Y 10/00 156/60 |
| 2016/0281986 | A1* | 9/2016 | Chang | F23R 3/007 |
| 2016/0329790 | A1* | 11/2016 | Li | H02K 1/2786 |
| 2018/0205299 | A1* | 7/2018 | Huang | H02K 5/04 |
| 2018/0262078 | A1* | 9/2018 | Huter | H02K 9/00 |
| 2018/0351435 | A1* | 12/2018 | Takano | H02K 9/227 |
| 2019/0348894 | A1* | 11/2019 | Huang | H02K 1/24 |
| 2021/0301817 | A1* | 9/2021 | Hartogh | B33Y 80/00 |

FOREIGN PATENT DOCUMENTS

| | | | | |
|---|---|---|---|---|
| CN | 110474498 | B | * 12/2021 | B29C 64/10 |
| GB | 2574409 | A | * 12/2019 | H02K 1/12 |

OTHER PUBLICATIONS

Metal 3D Printing of Synchronous Reluctance Motor, 2016 IEEE International Conference on Industrial Technology, p. 1125-1128 (Year: 2016).*

Fully 3D-Printed, Monolithic, Mini Magnetic Actuators, Journal of Microelectromechanical Systems, vol. 28, No. 3, Jun. 2019, pp. 481-493 (Year: 2019).*

* cited by examiner

SLOTTED STATOR CORE AND ADDITIVE MANUFACTURING METHOD FOR PRODUCTION

CROSS-REFERENCE TO RELATED APPLICATIONS

The present application claims the benefit of and priority to U.S. Provisional Application Ser. No. 62/882,635, entitled "SLOTTED STATOR CORE AND ADDITIVE MANUFACTURING METHOD FOR PRODUCTION," filed on Aug. 5, 2019, the entire contents of which being hereby expressly incorporated herein by reference.

FIELD OF THE DISCLOSURE

The present disclosure generally relates to fuel injectors, and more specifically to stator cores for solenoids used in such fuel injectors.

BACKGROUND OF THE DISCLOSURE

Solenoid actuated fuel injectors are known for use in supplying fuel to a combustion chamber of an internal combustion engine. It is desirable to provide fast acting solenoids (i.e., solenoids that can be energized and de-energized quickly during a fuel injection event) to permit efficient control of fuel injection. The speed with which a solenoid actuator opens and closes under control of a controller is influenced by rising and falling magnetic fields in the electrically conductive parts, which may create eddy currents that reduce response time. This may lead to non-optimal fuel delivery to the combustion chamber. Thus, reduction of eddy currents is desirable. One way to reduce these eddy currents is to provide a radially extending slot in the stator core of the solenoid of sufficient width to prevent current from traveling across the slot. More than one slot further reduces the eddy currents, but use of a stator core with multiple slots conventionally required the manipulation of multiple parts of the core and careful assembly during manufacturing. This additional manufacturing complexity increases cost and time required during production. Accordingly, it is desirable to provide a stator core having two or more slots that does not require precise manipulation and location of the stator core components relative to one another during assembly and further processing.

SUMMARY

In one embodiment, the present disclosure provides a one-piece solenoid stator core, comprising: a plurality of outer wall segments; a plurality of inner wall segments; and a lower wall extending between the plurality of outer wall segments and the plurality of inner wall segments; wherein a plurality of outer slots is defined between the plurality of outer wall segments and a plurality of inner slots is defined between the plurality of inner wall segments, each of the outer slots being radially aligned with an inner slot relative to a central axis of the stator core. In one aspect of this embodiment, the plurality of outer wall segments form a circumferential outer wall and the plurality of inner wall segments form a circumferential inner wall, and the outer wall and the inner wall form a gap configured to receive an annular core assembly. In one variation of this aspect, the outer wall includes an outer wall upper surface and the inner wall includes an inner wall upper surface, each of the outer slots extending from the outer wall upper surface to the lower wall and each of the inner slots extending from the inner wall upper surface to the lower wall. In another aspect, the plurality of inner wall segments form an inner opening to receive an inlet valve assembly. In yet another aspect, each of the outer slots of the plurality of outer slots is formed between adjacent pairs of outer wall segments and each of the inner slots of the plurality of inner slots is formed between adjacent pairs of inner wall segments. In yet another aspect, the outer slots extend along axes parallel with the central axis and the inner slots extend along axes parallel with the central axis. In still another aspect of this embodiment, the outer wall segments define an outer wall upper surface and the inner wall segments define an inner wall upper surface, the outer slots extending from the outer wall upper surface to the lower wall at an angle relative to the central axis and the inner slots extending from the inner wall upper surface to the lower wall at an angle relative to the central axis. In another aspect, each of the outer slots extends along a non-linear path and each of the inner slots extends along a non-linear path. In yet another aspect, the lower wall includes a plurality of lower slots, each of the outer slots being connected to an inner slot by a lower slot of the plurality of lower slots. In still another aspect of this embodiment, the plurality of outer wall segments, the plurality of inner wall segments, and the lower wall are formed using an additive manufacturing process such that the outer wall segments and the inner wall segments are formed onto the lower wall. In another aspect, the outer slots and the inner slots are filled with an electrically insulating material. In a variant of this aspect, the outer slots and the inner slots are filled using an over-molding process. In another variant, the outer wall segments the inner wall segments and the lower wall are coated with an electrically isolating material.

In another embodiment, the present disclosure provides a method of manufacturing a solenoid stator core, comprising: forming a lower wall using an additive manufacturing process; forming a plurality of outer wall segments upwardly from the lower wall using the additive manufacturing process; and forming a plurality of inner wall segments upwardly from the lower wall using the additive manufacturing process while forming the plurality of outer wall segments; wherein forming the plurality of outer wall segments includes forming a plurality of outer slots between adjacent outer wall segments, and forming the plurality of inner wall segments includes forming a plurality of inner slots between adjacent inner wall segments, each of the outer slots being radially aligned with an inner slot relative to a central axis of the stator core. In one aspect of this embodiment, forming a lower wall includes forming a lower insulating layer, then forming the lower wall on the lower insulating layer, and then forming an upper insulating layer on top of the lower wall. In another aspect, forming a plurality of outer wall segments includes forming an outer insulating layer on outer surfaces of the outer wall segments and forming an outer insulating layer on outer surfaces of the inner wall segments. In yet another aspect, forming a plurality of outer slots includes filling the outer slots with electrically insulating material and forming a plurality of inner slots includes filling the inner slots with electrically insulating material. In still another aspect of this embodiment, forming a lower wall includes forming a plurality of lower walls on a common substrate.

In yet another embodiment, the present disclosure provides a one-piece solenoid stator core prepared by a process comprising: forming a lower wall using an additive manufacturing process; forming a plurality of outer wall segments upwardly from the lower wall using the additive manufacturing process; and forming a plurality of inner wall segments upwardly from the lower wall using the additive manufacturing process while forming the plurality of outer wall segments; wherein forming the plurality of outer wall segments includes forming a plurality of outer slots between adjacent outer wall segments, and forming the plurality of inner wall segments includes forming a plurality of inner slots between adjacent inner wall segments, each of the outer slots being radially aligned with an inner slot relative to a central axis of the stator core. In one aspect of this embodiment, forming a lower wall includes forming a plurality of lower walls on a common substrate.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION

For the purposes of promoting an understanding of the principles of the present disclosure, reference is now made to the embodiments illustrated in the drawings, which are described below. The exemplary embodiments disclosed herein are not intended to be exhaustive or to limit the disclosure to the precise form disclosed in the following detailed description. Rather, these exemplary embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other. Furthermore, the terms "couples," "coupled," and variations thereof refer to any connection for machine parts known in the art, including, but not limited to, connections with bolts, screws, threads, magnets, electromagnets, adhesives, friction grips, welds, snaps, clips, etc.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 1:
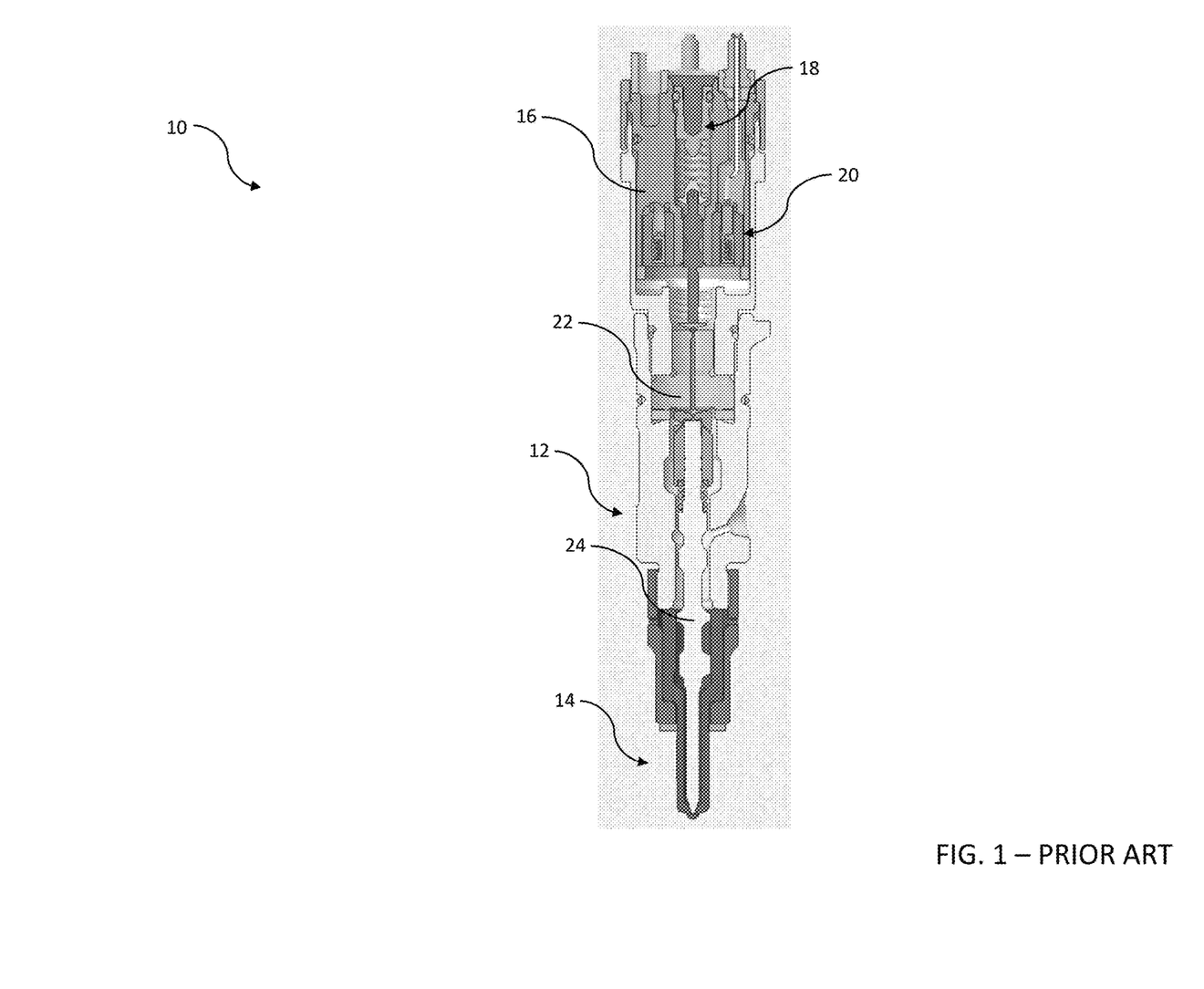
FIG. 1 is a side, cross-sectional view of a prior art fuel injector.

Referring now to FIG. 1, a fuel injector 10 generally includes an injector body 12, a nozzle module 14, and an upper housing 16 including an inlet valve assembly 18 and an actuator or solenoid 20. In general, fuel injector 10 is configured to inject metered quantities of fuel into a combustion chamber of the internal combustion engine in timed relation to the reciprocation of an engine piston (not shown). Solenoid 20 is actuated by receiving a control signal from a controller (not shown) to cause nozzle module 14 to permit fuel flow into the combustion chamber of the internal combustion engine (not shown). As is known in the art, when solenoid 20 is activated, fuel from inlet valve assembly 18 flows through a valve seat body 22 and ultimately, by movement of a nozzle valve element 24 in nozzle module 14, is injected through nozzle holes (not shown) in the nozzle module 14 into a combustion chamber.

Figure 2:
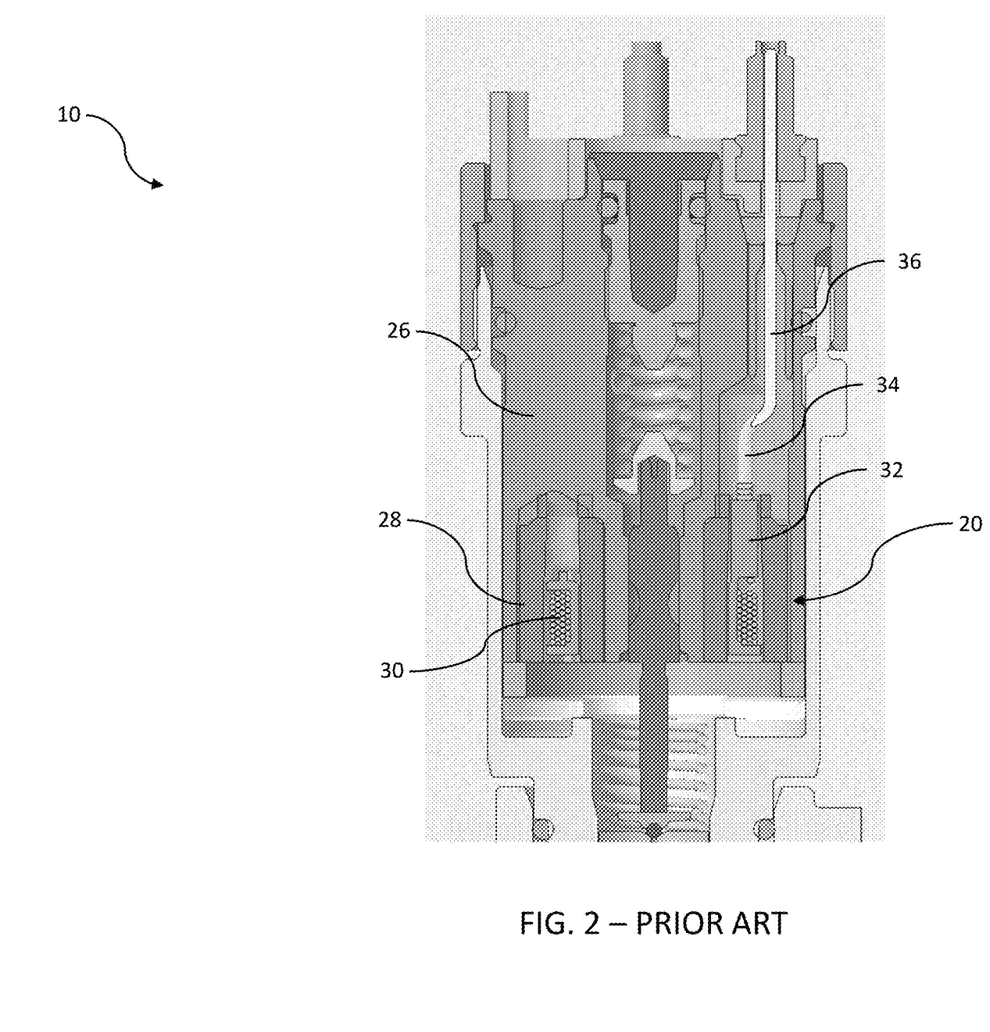
FIG. 2 is an enlarged, side, cross-sectional view of the prior art fuel injector of FIG. 1.

Referring now to FIG. 2, solenoid 20 generally includes a stator housing 26, a stator core 28 positioned within stator housing 26, and an annular coil assembly 30 positioned circumferentially in stator core 28. Protrusions 32 (only one shown) extend from coil assembly 30 and are coupled to leads 34 (only one shown) through which conductors 36 (only one shown) extend to connect to coils of coil assembly 30. Conductors 36 are energized and/or de-energized by a controller (not shown) to activate and deactivate solenoid 20, which in turn controls the injection of fuel in a manner known to those skilled in the art.

Figure 3:
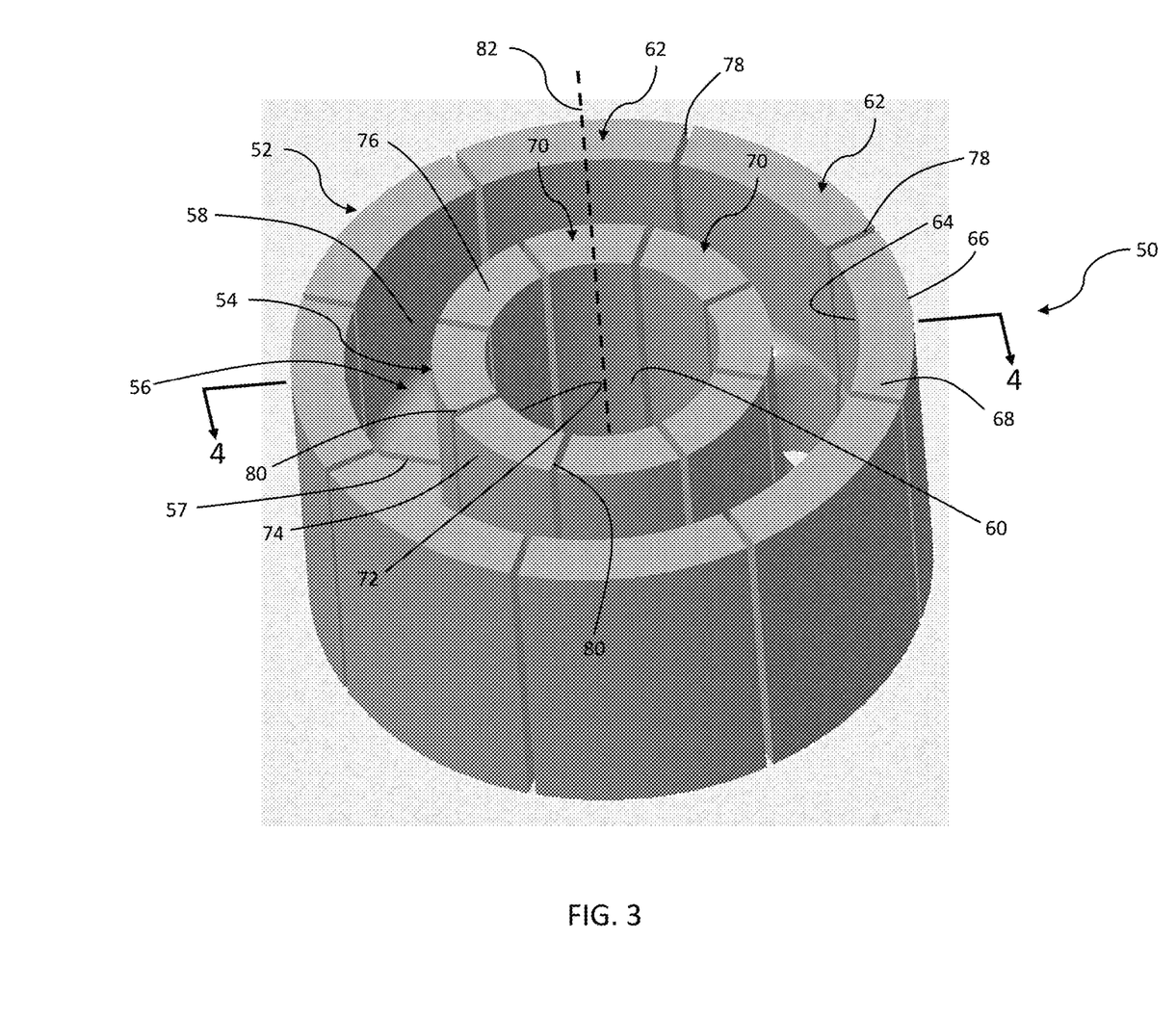
FIG. 3 is a perspective view of a multi-slot stator core according to one embodiment of the present disclosure.

FIG. 3 depicts one embodiment of a stator core 50 according to the present disclosure. Core 50 generally includes a segmented, circumferential outer wall 52, a segmented, circumferential inner wall 54, and a lower wall 56 connecting outer wall 52 to inner wall 54 and thereby defining a circumferential gap 58 therebetween. Gap 58 is sized and shaped to receive coil assembly 30 (FIGS. 1 and 2). Inner wall 54 also defines an inner opening 60 to receive other components of inlet valve assembly 18 (FIGS. 1 and 2).

Outer wall 52 generally includes a plurality of curved, outer wall segments 62, each having an inner surface 64, an outer surface 66 and an upper surface 68. Similarly, inner wall 54 generally includes a plurality of curved, inner wall segments 70, each having an inner surface 72, an outer surface 74 and an upper surface 76. An outer slot 78 is formed between each adjacent pair of outer wall segments 62 and an inner slot 80 is formed between each adjacent pair of inner wall segments 70.

Outer slots 78 of outer wall 52 are each aligned with corresponding inner slots 80 of inner wall 54 along a radial axis from the center of inner opening 60, perpendicular to a central axis 82 of core 50. In one embodiment, outer slots 78 extend along axes parallel with central axis 82 from upper surface 68 of outer wall 52 to lower wall 56. Similarly, inner slots 80 extend along axes parallel with central axis 82 from upper surface 76 of inner wall 54 to lower wall 56. Outer slots 78 may be connected to inner slots 80 by corresponding lower slots 57 formed in lower wall 56. In other words, in certain embodiments slots may pass through the core 50 in planes containing the radial vector (or normal to the azimuthal vector) and extending from the central axis 82 to the outside of core 50.

In other embodiments, outer slots 78 and inner slots 80 extend from upper surface 68 and upper surface 76, respectively, to lower wall 56 at an angle relative to central axis 82, or along a curved or non-linear path. In the embodiment shown in FIG. 3, eight sets of slots 78, 80 are shown. It should be understood, however, that more or few sets of slots 78, 80 may be used. In one embodiment, only a single slot 78 and a single slot 80 is used.

Core 50 is produced using an additive manufacturing process such that outer wall segments 62 and inner wall segments 70 are formed in their required locations for a particular application. In various embodiments, core 50 may be formed using any of a variety of additive manufacturing processes, including VAT photopolymerization, material jetting, binder jetting, material extrusion, powder bed fusion, sheet lamination, and directed energy deposition. In general, core 50 is formed using such processes by creating lower wall 56 from the bottom up, and creating outer wall segments 62 and inner wall segments 70 upwardly from lower wall 56. In this manner, the components of core 50 are built in place and do not need to be handled separately during assembly of solenoid 20.

It should be understood that any of a variety of suitable materials may be used to form core 50. In one embodiment, core 50 is created by additive manufacturing using two different materials, one metallic for carrying magnetic flux, and one electrically insulating. In such an embodiment, the electrically insulating material is added to fill the spaces depicted in FIG. 3 as slots 78, 80. In other words, in this embodiment, slots 78, 80 are not gaps between adjacent outer wall segments 62 and inner wall segments 70, but instead are areas of electrically insulating material between adjacent outer wall segments 62 and between adjacent inner wall segments 70. Thus, for purposes of this disclosure, outer wall segments 62 and inner wall segments 70 are referred to as first regions of outer wall 52 and inner wall 54, respectively, and slots 78, 80 or areas of electrically insulating material between the first regions are referred to as second regions of outer wall 52 and inner wall 54, respectively.

In alternative embodiments, slots 78, 80 are initially empty spaces between outer wall segments 62 and inner wall segments 70, respectively, but are later filled with electrically isolating material during, for example, an over-molding process. During such a process, outer wall segments 62 and inner wall segments 70 (as well as lower wall 56) could also be coated with an electrically isolating material. When core 50 is removed from the support structure used during the additive manufacturing process, the lower surface (not shown) of lower wall 56 may also be coated with an electrically isolating material.

Figure 4:
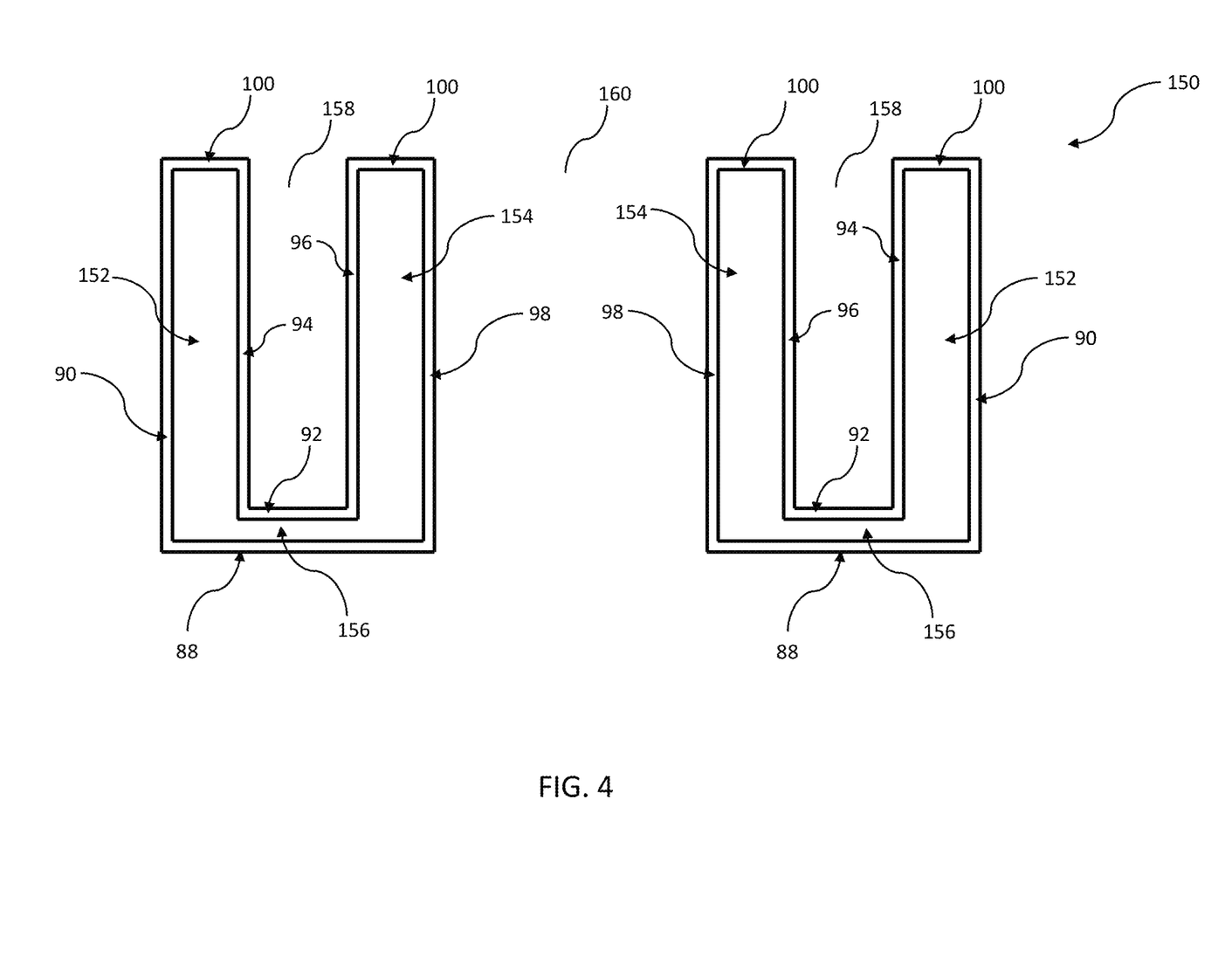
FIG. 4 is a side, cross-sectional view of an alternative embodiment of the stator core of FIG. 3.

Referring now to FIG. 4, an alternative embodiment of a stator core 150 is shown in cross-section taken along line 4-4 of FIG. 3. The elements of stator core 150 of FIG. 4 that are the same as those of core 50 of FIG. 3 use similar reference numbers increased by 100. In this embodiment, core 150 is formed by depositing electrically isolating material on all outer surfaces of the components during formation of the components. More specifically, a lower insulating layer 88 is first formed, then lower wall 156 is formed on top of lower insulating layer 88. While lower wall 156 is being formed, an insulating outer layer 90 is simultaneously formed on its outer surface. As outer wall 152 and inner wall 154 are being formed up from lower wall 156, an upper insulating layer 92 is formed on top of lower wall 156 in circumferential gap 158. Additionally, an inner insulating layer 94 is formed on the inner surface of outer wall 152, an outer insulating layer 96 is formed on the outer surface of inner wall 154, and an inner insulating layer 98 is formed on the inner surface of inner wall 154 in inner opening 160. Finally, after outer wall 152 and inner wall 154 are fully formed, an upper insulating layer 100 is formed on the upper surfaces of the walls. In this manner, outer wall 152, inner wall 154 and lower wall 156 are formed fully encased in electrically isolating material. It should also be understood that the slots (not shown) between adjacent segments of outer wall 152 and between adjacent segments of inner wall 154 would also include insulating layers or be filled entirely with electrically isolating material during formation of core 150.

Whether the cores 50, 150 of the present disclosure are formed using different materials for first regions and second regions or formed by creating outer wall segments 62 and inner wall segments 70, then over-molded to fill slots 78, 80 and coat outer wall segments 62 and inner wall segments 70, the cores can be removed from the supporting structure as a single assembled piece, which greatly improves the ease of assembling solenoid 20.

In certain embodiments, the materials used to form outer wall segments 62 and inner wall segments 70 (i.e., first regions of outer wall 52 and inner wall 54, respectively) may include iron based, soft magnetic materials such as cobalt-irons, nickel-irons, silicon-irons, and steel. The materials used for second regions and/or over-molding core 50 may include plastic, ceramic and other materials such as PVC, glass, asbestos, varnish, resin, Teflon and rubber.

Figure 5:
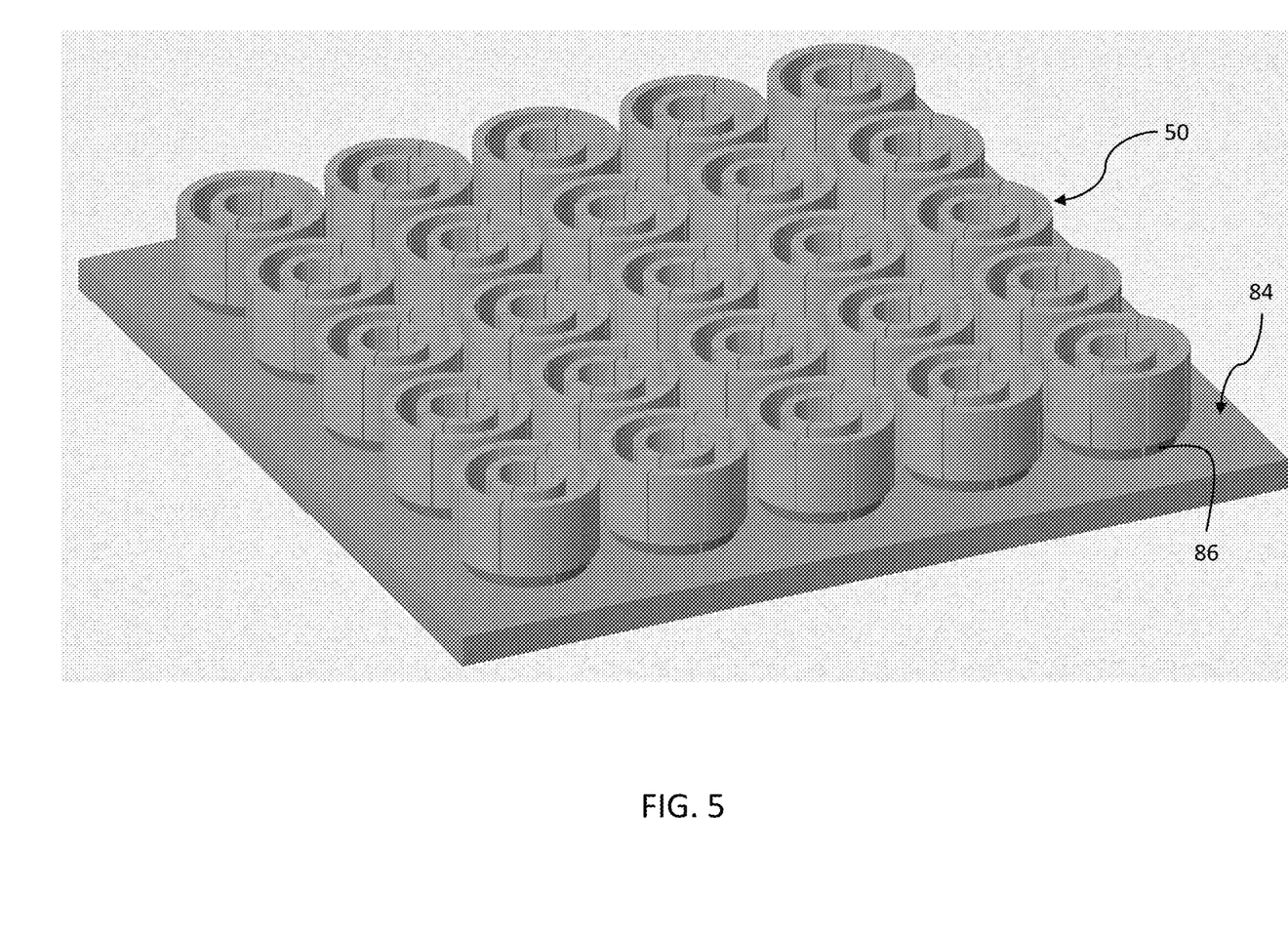
FIG. 5 is a perspective view of several multi-slot stator cores manufactured on a substrate according to one embodiment of the present disclosure.

Referring now to FIG. 5, a plurality of cores 50 are shown as having been formed on a common substrate 84 using the additive manufacturing processes described herein. While cores 50 are depicted in the figure, it should be understood that cores 150 may also be formed simultaneously in large numbers in the manner described herein. As a consequence of using an additive manufacturing process, the plurality of cores 50 may be formed very efficiently with or without non-conductive, electrically isolating materials in the second regions of outer wall 52 and inner wall 54. It should be understood that cores 50 may remain attached to substrate 84 during subsequent manufacturing steps such as over-molding, gluing or coating. At the end of the manufacturing process, cores 50 may be cut from substrate 84 such as at juncture 86 and the cut surface may be coated with electrically isolating material in the manner described above (such coating may be unnecessary for cores 150). It should also be understood that in certain embodiments, coil assemblies 30 (FIG. 2) may be assembled into circumferential gap 58 between outer wall 52 and inner wall 56 while cores 50 are still attached to substrate 84.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus, comprising:
    a solenoid stator core formed as a one-piece solenoid stator core on an additive manufacturing supporting structure, the solenoid stator core including:
        a plurality of outer wall segments;
        a plurality of inner wall segments; and
        a lower wall extending between the plurality of outer wall segments and the plurality of inner wall segments;
        wherein a plurality of outer slots is defined between the plurality of outer wall segments and a plurality of inner slots is defined between the plurality of inner wall segments, each of the outer slots being radially aligned with an inner slot relative to a central axis of the stator core, and wherein the plurality of outer wall segments and the plurality of inner wall segments are coupled by electrically insulating material such that the solenoid stator core is removable as a single piece from the additive manufacturing supporting structure on which the solenoid stator core was formed.

2. The apparatus of claim 1, wherein the plurality of outer wall segments form a circumferential outer wall and the plurality of inner wall segments form a circumferential inner wall, and the outer wall and the inner wall form a gap configured to receive an annular core assembly.

3. The apparatus of claim 2, wherein the outer wall includes an outer wall upper surface and the inner wall includes an inner wall upper surface, each of the outer slots extending from the outer wall upper surface to the lower wall and each of the inner slots extending from the inner wall upper surface to the lower wall.

4. The apparatus of claim 1, wherein the plurality of inner wall segments form an inner opening to receive an inlet valve assembly.

5. The apparatus of claim 1, wherein each of the outer slots of the plurality of outer slots is formed between adjacent pairs of outer wall segments and each of the inner slots of the plurality of inner slots is formed between adjacent pairs of inner wall segments.

6. The apparatus of claim 1, wherein the outer slots extend along axes parallel with the central axis and the inner slots extend along axes parallel with the central axis.

7. The apparatus of claim 1, wherein the outer wall segments define an outer wall upper surface and the inner wall segments define an inner wall upper surface, the outer slots extending from the outer wall upper surface to the lower wall at an angle relative to the central axis and the inner slots extending from the inner wall upper surface to the lower wall at an angle relative to the central axis.

8. The apparatus of claim 1, wherein each of the outer slots extends along a non-linear path and each of the inner slots extends along a non-linear path.

9. The apparatus of claim 1, wherein the lower wall includes a plurality of lower slots, each of the outer slots being connected to an inner slot by a lower slot of the plurality of lower slots.

10. The apparatus of claim 1, wherein the plurality of outer wall segments, the plurality of inner wall segments, and the lower wall are formed using an additive manufacturing process such that the outer wall segments and the inner wall segments are formed onto the lower wall.

11. The apparatus of claim 1, wherein the outer slots and the inner slots are filled with an electrically insulating material.

12. The apparatus of claim 11, wherein the outer slots and the inner slots are filled using an over-molding process.

13. The apparatus of claim 11, wherein the outer wall segments, the inner wall segments, and the lower wall are coated with an electrically isolating material.

14. A method of manufacturing a solenoid stator core, comprising:
    forming a lower wall on a manufacturing supporting structure using an additive manufacturing process;
    forming a plurality of outer wall segments upwardly from the lower wall using the additive manufacturing process;
    forming a plurality of inner wall segments upwardly from the lower wall using the additive manufacturing process;
    wherein forming the plurality of outer wall segments includes forming a plurality of outer slots between adjacent outer wall segments, and forming the plurality of inner wall segments includes forming a plurality of inner slots between adjacent inner wall segments, each of the outer slots being radially aligned with an inner slot relative to a central axis of the stator core; and
    removing the solenoid stator core as a single piece from the manufacturing supporting structure on which the solenoid stator core was formed.

15. The method of claim 14, wherein forming the lower wall includes forming a lower insulating layer, then forming the lower wall on the lower insulating layer, and then forming an upper insulating layer on top of the lower wall.

16. The method of claim 14, wherein forming the plurality of outer wall segments includes forming an outer insulating layer on outer surfaces of the outer wall segments and forming an outer insulating layer on outer surfaces of the inner wall segments.

17. The method of claim 14, wherein forming the plurality of outer slots includes filling the outer slots with electrically insulating material and forming the plurality of inner slots includes filling the inner slots with electrically insulating material.

18. The method of claim 14, wherein forming the lower wall includes forming the plurality of lower walls on a common substrate.

19. A solenoid stator core prepared as a single piece on a manufacturing supporting structure by a process comprising:

forming a lower wall using an additive manufacturing process;

forming a plurality of outer wall segments upwardly from the lower wall using the additive manufacturing process; and forming a plurality of inner wall segments upwardly from the lower wall using the additive manufacturing process;

wherein forming the plurality of outer wall segments includes forming a plurality of outer slots including insulating material between adjacent outer wall segments, and forming the plurality of inner wall segments includes forming a plurality of inner slots including insulating material between adjacent inner wall segments, each of the outer slots being radially aligned with an inner slot relative to a central axis of the stator core;

wherein the solenoid stator core is removable as a single piece from the manufacturing supporting structure on which the solenoid stator core was formed.

20. The solenoid stator core of claim 19, wherein forming the lower wall includes forming the plurality of lower walls on a common substrate.

\* \* \* \* \*